United States Patent [19]

Huang et al.

[11] Patent Number: 5,035,593

[45] Date of Patent: Jul. 30, 1991

[54] PRESSURIZED SLURRY CASTING MACHINE FOR PRODUCING CERAMIC ARTICLES

[75] Inventors: Liang Y. Huang, Taipei, Taiwan; San Y. Chen, Kaohsiung, China

[73] Assignee: Industrial Technology Research Institute, Taiwan, Taiwan

[21] Appl. No.: 432,787

[22] Filed: Nov. 7, 1989

[51] Int. Cl.[5] .............................................. B29C 39/42

[52] U.S. Cl. ..................................... 425/85; 425/197; 425/200; 425/376.1; 425/447; 425/449; 425/451.9; 264/87; 264/101; 264/302

[58] Field of Search .................. 264/101, 102, 87, 24, 264/86, 66, 65, 302; 210/114, 123; 209/233; 366/273, 274; 425/376.1, 197, 200, 85, 447, 449, 451.9

[56] References Cited

U.S. PATENT DOCUMENTS

| | | | |
|---|---|---|---|
| 1,710,208 | 4/1929 | Deitz, Jr. | 209/233 |
| 3,311,678 | 3/1967 | Brock et al. | 264/102 |
| 3,530,551 | 9/1970 | Haes et al. | 264/24 |
| 3,749,369 | 7/1973 | Landsberger | 366/273 |
| 4,061,176 | 12/1977 | Carbonnel | 164/61 |
| 4,136,009 | 1/1979 | Samiran | 210/114 |
| 4,818,448 | 4/1989 | Wrenn, Jr. et al. | 264/86 |
| 4,931,007 | 6/1990 | Gold/Dagl et al. | 249/65 |

FOREIGN PATENT DOCUMENTS

| | | | |
|---|---|---|---|
| 62-161449 | 7/1987 | Japan | 264/61 |
| 695820 | 11/1979 | U.S.S.R. | 264/86 |

*Primary Examiner*—Jay H. Woo

*Assistant Examiner*—Jeremiah F. Durkin, II

*Attorney, Agent, or Firm*—Scully, Scott, Murphy & Presser

[57] ABSTRACT

A pressurized slurry casting machine is provided which includes a feed tank with an agitator, a vertical conduit extending from the feed tank to a mold. The machine operates by creating pressure in the feed tank with the agitator propeller whereby the ceramic slurry will be forced to move up the straight conduit into the mold so as to be formed into the desired article. The respective connections of the conduit to the mold and the feed tank are each air-tight connections such that no air bubble-like contamination will result in the finished ceramic product. There is also provided a vacuum system capable of producing a negative pressure in the feed tank.

6 Claims, 3 Drawing Sheets

PRESSURIZED SLURRY CASTING MACHINE FOR PRODUCING CERAMIC ARTICLES

BACKGROUND OF THE INVENTION

Slurry casting is one of the most frequently used method for forming ceramic articles. Its primary advantages include ease of operation, low cost and wide applicability. The method can be used for producing numerous ceramic articles of complex shapes and sizes.

Earlier slurry casting machines, however, suffer from disadvantages in low precision, poor homogeneity and poor reproducibility. In view of these and other problems, pressurized slurry casting machines have been under development.

Conventional pressurized slurry casting machines for ceramic articles, nevertheless, has some shortcomings such as poor air tightness in the feed tank, difficulty for vacuum operation and frequent plugging by agglomerates of materials in the flow conduit.

With reference to FIG. 4, the operation of a conventional pressurized slurry casting machine for ceramic articles will be illustrated. FIG. 4 is representative of a present pressurized slurry casting machine. With valves 401 and 901 closed, the feed tank 10 and the transport conduit 40 are first vacuumed by the vacuum system 102, after which the vacuum system 102 is turned off and the feed valve 901 is opened. The slurry feed 90 is then drawn rapidly into feed tank 10 by vacuum suction. After the desired amount of feed enters the feed tank 1, the tank is further vacuumed by turning on again vacuum system 102 while the feed is agitated by a propeller 201 fitted on an agitator shaft 20 driven by motor 30 such that air bubbles in the slurry feed is expelled from the slurry (degassing). After sufficient degassing, the vacuum system 102 is turned off again and the pressurizing system 101 and control valve 401 are turned on such that the slurry feed 90 is pressurized and thus forced into mold 70 by way of transport conduit 40. At the same time the pressing plate 60 is lowered to exert pressure against mold 70. After consolidation of the slurry feed in the mold, the product is demoulded. The apparatus is then cleaned for next production.

Such conventional pressurized slurry casting apparatus has many disadvantages, some of which are illustrated below:

(1) The horizontal arrangement and the multiple elbows of the transport conduit 40 render the degassing of the slurry within the section from propeller 201 to control valve 40 nearly impossible. As a consequence, the slurry will unavoidably contain a certain amount of bubbles after entering mold 70 and the quality of the product will be significantly deteriorated by the existence of bubbles in the final product.

(2) Precipitation in the slurry feed and plugging by the slurry are frequently observed in the transport conduit 40 due to the horizontal arrangement and multiple elbows of the transport conduit 40. Such phenomena frequently result in difficulties in operation and homogeneity problem in the products.

(3) During the casting of the slurry, if the slurry feed is not sufficient, air will enter the mold through the space on the upper part of the transport conduit 40 as shown by FIG. 4 and result in air bubble defects in the product.

(4) After the casting operation, the residual slurry in the conduit 40 can not be easily removed and will result in waste of the raw material. Furthermore, the residual slurry will create severe plugging problem in the conduit if the residual slurry solidified in the conduit. Due to the horizontal arrangement and elbows of the conduit, it is rather difficult to clean the conduit after casting. If the apparatus is not thoroughly cleaned for next operation, old slurry will mix with new slurry and result in unstable and poor quality of the final product.

(5) No vacuum system is used for the casting system 50 and therefore the air in the mold will constitute a resistance to the entrance of the slurry feed. As a result the mold cavity cannot be completely filled by the slurry feed and the final product will unavoidably contain bubbles and the failure rate will be increased.

(6) Air tightness of the bearing section of the agitator shaft which extends from outside of the feed tank frequently adds to the difficulties in vacuuming the feed tank 10. Furthermore, the metal scraps abraded off by the propeller under high power rotation will form contaminations of the feed and result in speck defects in the final product.

In the conventional pressurized slurry casting, waste of material is frequently encountered. The products of such conventional casting machine often exhibits pin holes and specks of impurities, rendering their quality unstable.

With these and other drawbacks, conventional pressurized slurry casting machines for ceramic articles are used solely for conventional ceramic products but not for the production of fine ceramics. Accordingly, there is need for a satisfactory improvement to this type of casting machine.

SUMMARY OF THE INVENTION

It is therefore an object of the present invention to provide a pressurized slurry casting machine for ceramic articles which can result in sufficient precision, homogeneity and reproducibility for application in producing fine ceramic products.

It is another object of the present invention to provide a pressurized slurry casting machine for ceramic articles which can produce ceramic articles with less defects such as pin hole defects, bubble defects and metal contamination.

The present invention in its broadest context encompasses a pressurized slurry casting machine for casting ceramic articles which comprises:

(1) a feed tank fitted with an agitator, the propeller of the agitator being at just above the bottom of the feed tank;

(2) a vertical conduit comprising a lower opening positioned above the agitator and an upper opening for delivering the slurry to a mold, the conduit being connected with the feed tank in an air tight relation except in the openings of the conduit;

(3) means for fixing the mold above the upper opening of the conduit with the mold cavity of the mold connected with the vertical conduit in an air tight relation;

(4) a pressurizing system capable of applying positive pressure in the feed tank; and (5) a vacuum system capable of applying negative pressure in the feed tank.

DETAILED DESCRIPTION OF THE INVENTION

In view of the shortcomings of the conventional pressurized slurry casting machine for ceramic articles, the present invention provides improvements over the conventional machine. The improvements by the present invention are mainly results of adopting a transport conduit for pressurizing and delivering the ceramic slurry raw material into the mold cavity. The ceramic slurry is pressurized and delivered from a lower feed tank to a higher mold cavity through the vertical conduit. When the casting is completed, the residual slurry may be allowed to automatically drop back to the feed tank. The work of cleaning the conduit is greatly reduced. On the other hand, the vertical design of transport conduit prevents air from entering into the mold during casting operation. This also helps to reduce the bubble defects in the product.

Other inventive features of the present invention include:

(1) A vacuum hood is provided around the mold to give a negative back pressure around the mold such that the air in the mold cavity can be removed before casting to enhance the compactness of the casted green compact and to reduce the defects thereof.

(2) A magnetic agitator is used as the agitator such that the air leakage and metal scrap contamination problems accompanying conventional agitators are prevented.

(3) A floating sieve is installed in the feed tank such that large agglomerates in the feed slurry are prevented from entering the mold.

Figure 1:
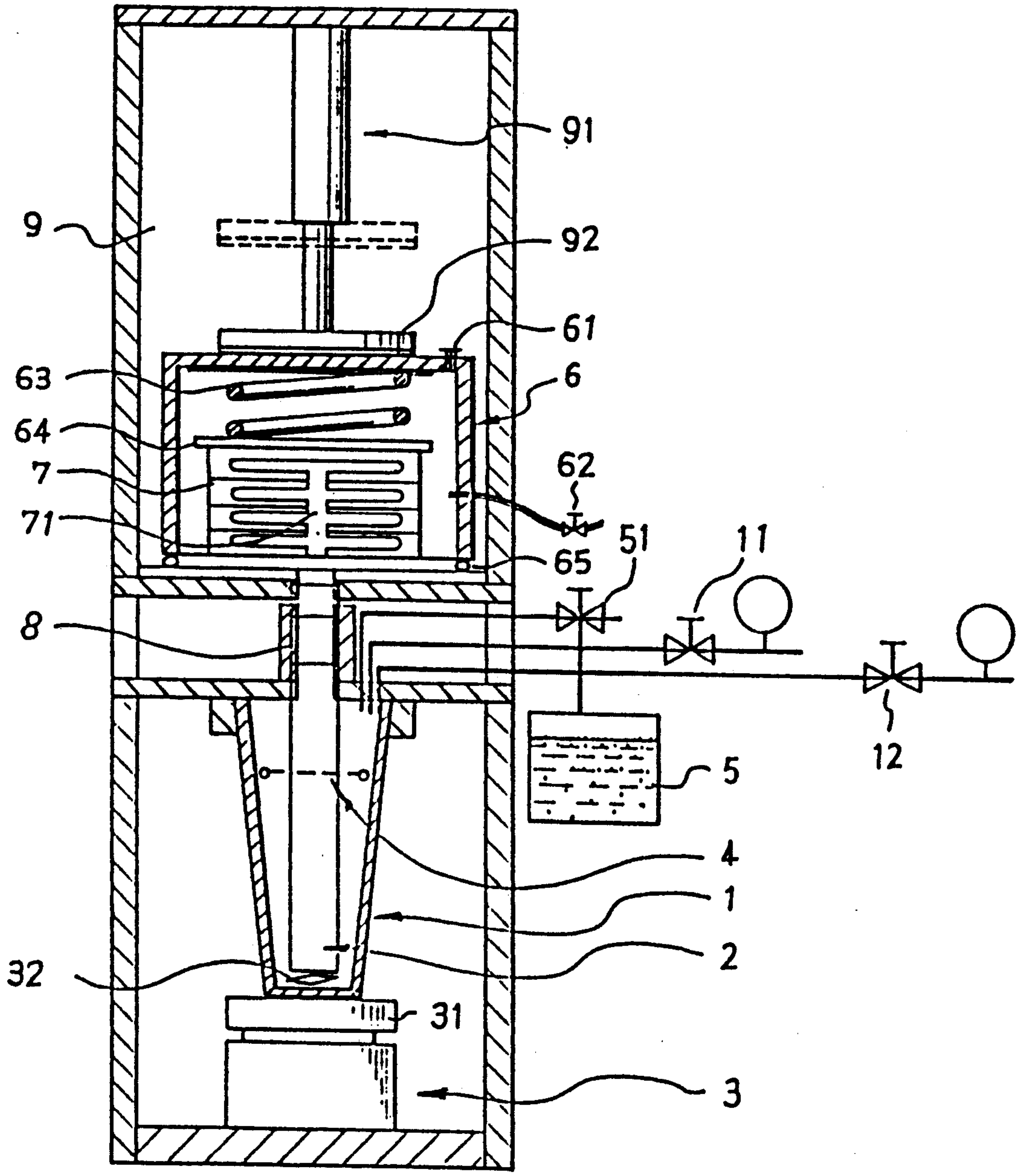
FIG. 1 is a schematic drawing of the pressurized slurry casting machine of the present invention.

With reference to FIG. 1, the structure and operation of the present invention will be illustrated. With the vertical type pressurized casting machine of the present invention, a ceramic slurry feed 5 can be delivered into the feed tank 1 by decantation or by vacuum suction by way of a leak valve 51. It is preferable to deliver feed into the feed tank by vacuum suction in consecutive productions. The feed tank preferably has a slant side wall such that the bottom of the feed tank will have a smaller cross sectional area as compared with its top section. Such smaller bottom area will reduce the waste of raw materials. A vertical transport conduit 2 is installed in the feed tank 1. The vertical transport conduit 2 and the feed tank 1 are fixed such that the feed tank is air tight except in the openings of the vertical transport conduit. A control valve 8 is installed near the upper end of the transport conduit to control the flow of slurry and air. The lower end of the vertical transport conduit 2 is spaced from the bottom of the feed tank 1 with an adequate distance allowing the slurry feed to be pressurized up to the top of the transport conduit 2. A vacuum system 11 and a pressurizing system 12 are connected to the feed tank 1 for necessary pressurization and vacuuming in the casting operation. In suction feed operation, the control valve 8 is shut off and the vacuum system 11 is turned on and the leak valve 51 is opened until desired amount of slurry 5 enters the feed tank 1.

After the desired amount of feed is delivered into the feed tank 1, the leak valve 51 is closed and the vacuum system 11 is turned on again. The slurry is then agitated by the magnetic agitator 32 in the feed tank. A magnetic inducer 31 is installed below the feed tank. A magnetic inducer with a heating plate may be used to apply necessary heating. The air bubbles in the slurry feed will be expelled by the cooperation of agitating and vacuuming. The viscosity of the slurry is generally about 1000 centipoise. Such viscosity is within the operational limit of magnetic agitator. With such magnetic agitator, air leakage problem and metal scrap contamination problem can be completely prevented since no bearing and no metallic propeller are involved.

Figure 2:
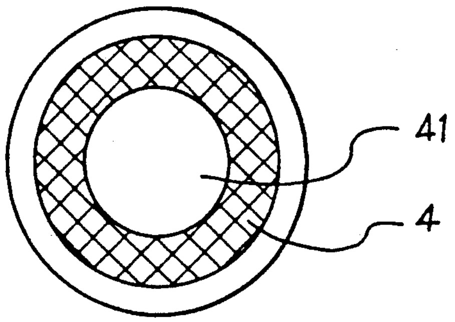
FIG. 2 is a schematic drawing showing the filter for use in the feed tank of the present invention.

With reference to FIGS. 1 and 2, a floating sieve 4 is provided in the feed tank 1. Such sieve has a hole 41 at its center with adequate diameter such that the transport conduit can pass freely through the hole with a minimum clearance, The sieve is effective for preventing any large agglomerates from entering the transport conduit and the mold.

With reference to the upper portion of FIG. 1, a multiple layer casting mold 7 with horizontal flow conduits 71 is fixed within the vacuum hood 6 with the help of an air motivated cylinder 91. The skirt of the vacuum hood 6 is fitted with an air seal 65 to ensure complete air tightness of the vacuum hood. After the fixation of the mold, it is important to ensure that the vacuum hood and the feed tank forms a sufficiently air tight compartment such that vacuum or pressurizing can be effected within the compartment. A check valve 61 is fitted to the upper plate of the vacuum hood. Another vacuum system 62 is connected to the vacuum hood. A strong spring 63 and a pressing plate 64 is provided within the vacuum hood. Before casting, the vacuum hood is fixed by the pressing plate 92 connected to the air cylinder 91. Mold 7 is then pressed against the bottom plate by the strong spring 63 and the pressing plate 64. Vacuum system 62 is turned with the check valve 61 shut off to produce vacuum environment around the mold 7. With the vacuum system 62 on, the mold is then ready for the slurry well degassed in the lower portion of the casting machine. The vacuum around the mold will reduce the resistance to the entrance of the slurry into the mold cavity and eliminate the void formation within the mold cavity.

Figure 3:
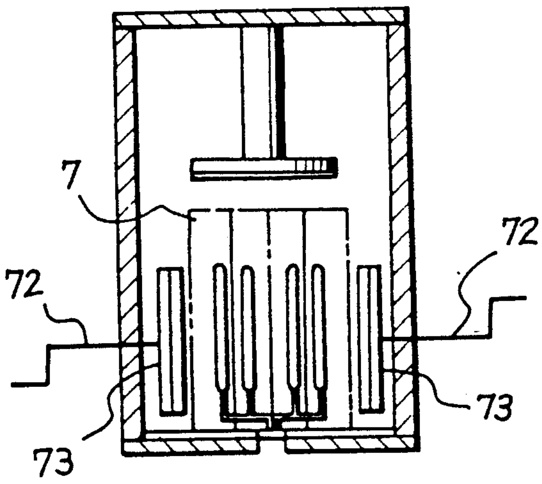
FIG. 3 is a schematic drawing showing another embodiment of the fixation of the mold of the present invention.

In another embodiment of the present invention, the vacuum hood is not installed. With reference to FIG. 3, a multiple layer casting mold 7 with vertical flow conduits are fixed horizontally by fixing plates 73 driven by gear shafts 72. Satisfactory results can also be obtained with this embodiment.

The apparatus of the present invention is mainly characterized by the vertical and straight arrangement of the feed tank 1, the transport conduit 2 and the mold 7.

After sufficient degassing of the slurry in the feed tank 1 and the positive fixation of the mold as described above, the vacuum system 11 is turned off, the pressurizing system 12 is turned on, and the control valve 8 is opened. The slurry will be pushed by compressed air into the mold cavity 71 through vertical conduit 2. After consolidation of slurry in the mold cavity, the pressure in the feed tank and the vacuum in the vacuum hood (if present) are relieved and the residual slurry is allowed to drop back to the feed tank. After replacing a new mold, the casting process may be repeated. The green compact is then demoulded, giving the desired green casting.

Figure 5:
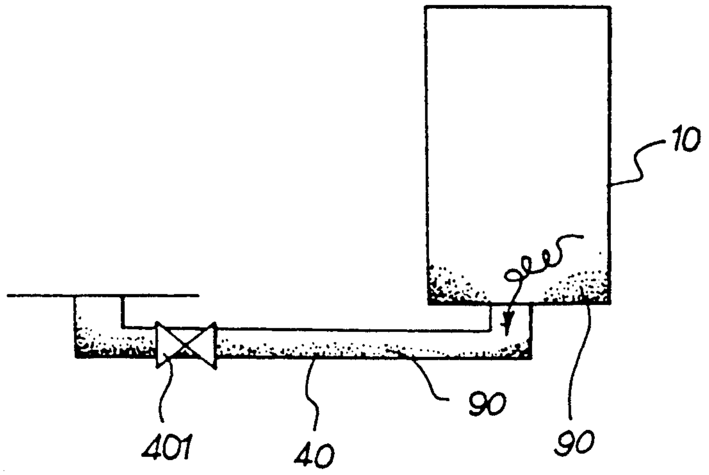
FIG. 5 PRIOR ART
FIG. 5 is a schematic diagram showing the conventional combination of the feed tank and the transport conduit.
Figure 4:
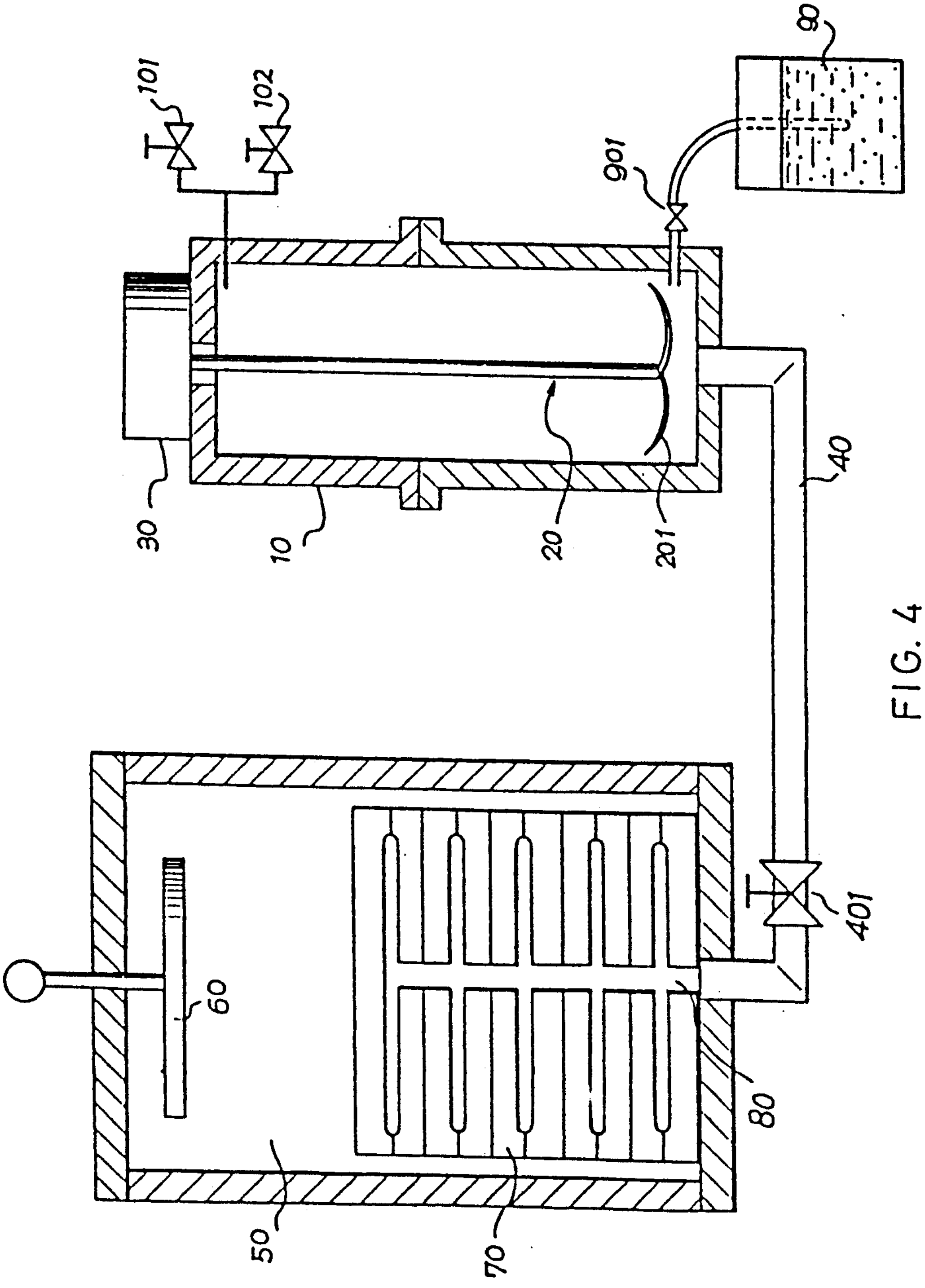
FIG. 4 PRIOR ART
FIG. 4 is a schematic drawing of a conventional pressurized slurry casting machine for ceramic articles.

Since the degassed ceramic slurry is delivered from the lower opening of the vertical transport conduit, the air bubble which usually occurs at the surface of the stirred slurry will not be entrapped into the transport conduit as usually observed in the prior art transport system (as shown by FIGS. 4 and 5.) Furthermore, in the present invention, after the casting is completed and the pressure is relieved, the excessive slurry will drop automatically to the feed due to the vertical arrangement of the conduit In the prior art horizontal conduit, however, it is necessary to apply vacuum in the feed tank to withdraw the excessive slurry due to the horizontal arrangement of the transport conduit. This will frequently result in the formation of bubbles in the casted green compact.

The following examples are provided by way of illustration and not by way of limitation.

EXAMPLES

Cuttery (ex. Knives) made of zirconium oxide were prepared respectively by the casting machine of the present invention and a conventional casting machine. The dimension of the cuttery was $3\times270\times35$ mm. With conventional casting machine, the chance of obtaining products without apparent surface defects was lower than 50%. The density of the products was about 97%. The wasted material was about 1.8 Kg (¼ to the total feed). With the casting machine of the present invention, the chance of obtaining products without apparent surface defects was about 98%. The density of the products was about 99.4%. The wasted material was about 260 g (1/30 to the total feed).

As evidenced by the above results, the present invention can improve the quality of the products. Vertical and straight design of the transport conduit not only facilitates the cleaning of the apparatus but also reduced the contamination and waste of the feed. The results show apparent improvements over prior art casting machine.

We claim:

1. A pressurized slurry casting machine for casting ceramic articles with a ceramic slurry feed which comprises:

(1) a feed tank having a slurry feed with a leak valve and a supply of slurry, fitted with an agitator comprising a propeller; said propeller being just above a bottom of said feed tank;

(2) a straight vertical conduit comprising a lower opening positioned above said propeller and an upper opening for delivering said slurry feed to a mold above said vertical conduit, said vertical conduit being connected with said feed tank in an air tight relation except in the openings of said vertical conduit;

(3) means for biasing said mold through the action of a pneumatic piston and a spring sequentially above said mold above said upper opening of said vertical conduit with the mold cavity of said mold connected with said vertical conduit in an air tight relation;

(4) a pressurizing system fixedly connected to said feed tank and which has a valve means capable of applying positive pressure in said feed tank to force said slurry upwardly in said vertical conduit; and (5) a vacuum system fixedly connected to said feed tank and which has a valve means capable of applying negative pressure in said feed tank for a degassing of said slurry prior to molding.

2. The casting machine of claim 1, wherein said means for fixing said mold comprises a vacuum hood for applying a negative back pressure around said mold.

3. The casting machine of claim 1, wherein said agitator is a magnetic agitator motivated from outside of said feed tank.

4. The casting machine of claim 1, wherein said feed tank has a slant side wall such that the horizontal cross sectional area of said feed tank increases with the increase in elevation.

5. The casting machine of claim 1, wherein said feed tank is further fitted with a floating sieve for filtering said slurry feed said sieve slideably occupying a space defined by said vertical conduit at its center and a feed tank wall at the outer edge.

6. The casting machine of claim 1, wherein a vacuum hood is biased by an air cylinder positioned above said hood to bias said hood downwardly into sealed contact with said vertical conduit.

* * * * *